United States Patent [19]

Narang et al.

[11] Patent Number: 5,367,051
[45] Date of Patent: Nov. 22, 1994

[54] AMINE-CONTAINING POLYMERIZABLE MONOMERS AND POLYMERS FUNCTIONALIZED WITH FULLERENES TO PROVIDE POLYMERS WITH HIGH TEMPERATURE STABILITY

[75] Inventors: Subhash C. Narang, Redwood City; Susanna C. Ventura; Sivapackia Ganapathiappan, both of Mountain View, all of Calif.; Tilak R. Bhardwaj, Chandigarh, India; Asutosh Nigam, Fremont, Calif.

[73] Assignee: SRI International, Menlo Park, Calif.

[21] Appl. No.: 96,045

[22] Filed: Jul. 22, 1993

[51] Int. Cl.$^5$ ............................................. C08G 73/00
[52] U.S. Cl. ................................... 528/424; 528/422; 564/306; 564/308
[58] Field of Search ................ 528/424, 422; 564/306, 564/308

[56] References Cited

U.S. PATENT DOCUMENTS

| | | | |
|---|---|---|---|
| 4,908,442 | 3/1990 | Narang et al. | 540/145 |
| 5,114,477 | 5/1992 | Mort et al. | 106/20 |
| 5,177,248 | 1/1993 | Chiang et al. | 560/86 |

OTHER PUBLICATIONS

J. Am. Chem. Soc. May 5, 1993, 115, No. 9, pp. 3850–3851, Geckeler et al, "Polymer-Bound $C_{60}$".
J. Am. Chem. Soc. May 5, 1993, vol. 115, No. 9, pp. 3844–3845, Y. Wang,"Fullerene-Doped Polysilane Photoconductor".
J. Am. Chem. Soc. May 5, 1993, vol. 115, No. 13, pp. 5829–5830, Smith et al, "1,2 Methanolbuckminister-fullerene ($C_{61}H_2$), The parent Fullerene Cyclopropane: Synthesis and Structure".
J. Am. Chem. Soc. Jan. 29, 1992, vol. 114, No. 26, pp. 10656–10657, Shi, et al "A Polyester & Polyurethane of Diphenyl $C_{61}$: Retention of Fulleroid Properties in A Polymer".
J. Am. Chem. Soc. Jun. 29, 1992, vol. 114, No. 3, pp. 1103–1105, Creegan et al "Synthesis & Characterization of $C_{60}O$, The First Fullerene Epoxide".
J. Am. Chem. Soc., 1991 vol. 113, No. 15, pp. 5907–5908, Wood et al, "Oxygen and Methylene Adducts of $C_{60}$ and $C_{70}$".
Bae, Y. K., et al., "Production, Characterization, and Deposition of Carbon Clusters", Symposium on Clusters and Cluster Assembled Materials: Special Session on Buckminsterfullerene, Boston, Mass., Nov. 29, 1990, published in *The Proceedings of the 1990 Meeting of the MRS Society*, pp. 1–9.
Bausch, Joseph W., et al., "Diamagnetic Polyanions of the $C_{60}$ and $C_{70}$ Fullerenes: Preparation, $^{13}C$ and $^7Li$ NMR Spectroscopic Observation, and Alkylation with Methyl Iodide to Polymethylated Fullerenes", *Journal of American Chemical Society*, vol. 113, Jan. 1991, pp. 3205–3206.
Hawkins, Joel M. et al., "Crystal Structure of Osmylated $C_{60}$: Confirmation of the Soccer Ball Framework", *Science*, vol. 252, pp. 312–313 Mar. 1991.
Hawkins, Joel M., et al., "Organic Chemistry of $C_{60}$ (Buskminsterfullerene): Chromatography and Osmylation", *Journal of Organic Chemistry*, vol. 55, Nov. 1990, pp. 6250–6252.
Kratschmer, W., et al., "Solid $C_{60}$: A New Form of Carbon", *Nature*, vol. 347, Sep. 27, 1990, pp. 354–357.
Wudl, F., et al., "Survey of Chemical Reactivity of $C_{60}$, Electrophile and Dieno-polarophile Par Excellence", published in *ACS Symposium Series* 481, 201st National Meeting of the American Chemical Society at Atlanta, Georgia, Apr. 14–19, 1991, pp. 161–175.

*Primary Examiner*—Morton Foelak
*Assistant Examiner*—P. Hampton-Hightower
*Attorney, Agent, or Firm*—John P. Taylor

[57] ABSTRACT

Fullerene-functionalized amine-containing polymers and polymerizable monomers are disclosed characterized by high temperature stability, i.e., capable of withstanding a temperature of at least about 300° C., and in some instances as high as 650° C., when in polymerized form. The fullerene groups are bonded to the polymers through the amine groups on the polymer. In some instances enhanced mechanical properties also result and, in the case of cross-linked polymers, a composite can be formed from such materials which is structurally reinforced at the molecular level, with the fullerene groups acting as the molecular level structural reinforcement.

17 Claims, 1 Drawing Sheet

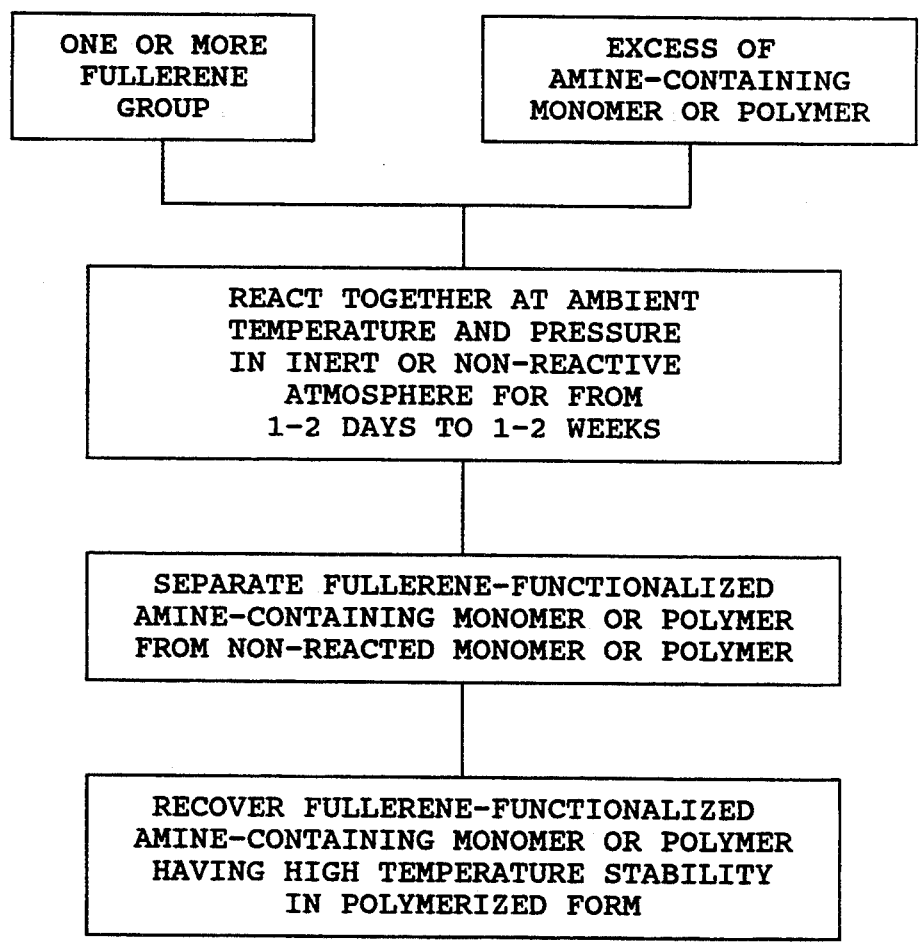

AMINE-CONTAINING POLYMERIZABLE MONOMERS AND POLYMERS FUNCTIONALIZED WITH FULLERENES TO PROVIDE POLYMERS WITH HIGH TEMPERATURE STABILITY

BACKGROUND OF THE INVENTION

1. Field of the Invention

This invention relates to the formation of amine-containing polymers and polymerizable monomers functionalized with fullerenes to provide polymers with high temperature stability, and monomers capable of forming polymers having high temperature stability.

2. Description of the Related Art

Recently it was discovered that all-carbon molecules, which are soluble in a number of organic solvents, could be produced by the evaporation of graphite. The most common of these all-carbon molecules is a $C_{60}$ carbon molecule having the general shape of a geodesic dome, giving rise to its name Buckminsterfullerene after the designer of such geodesic domes. Subsequently it was discovered that a number of such all-carbon molecules existed, having various numbers of carbon atoms and various cage-like shapes, including distorted spheres and even tubular-like shapes.

Fullerene formation and recovery methods are described, for example, by Kratschmer et al. in "Solid $C_{60}$:A New Form of Carbon", published in Nature, Volume 247, pp 354–357, on Sep. 27, 1990; and by Y. K. Bae et al. in "Production, Characterization, and Deposition of Carbon Clusters", prepared for the Symposium on Clusters and Cluster Assembled Materials Special Session on Buckminsterfullerenes, in Boston, Mass. Nov. 29, 1990, and published in The Proceedings of the 1990 Meeting of the MRS Society.

Reaction of such fullerene compounds with other organic moieties has been reported. Hawkins et al., in articles respectively entitled "Organic Chemistry of $C_{60}$ (Buckminsterfullerene): Chromatography and Osmylation", J. Org. Chem. 1990, 55, pp 6250–6252 and "Crystal Structure of Osmylated $C_{60}$: Confirmation of the Soccer Ball Framework", Science, Vol. 252, Apr. 1991, pp 312–313, report on a reaction between $C_{60}$ fullerene and osmium tetraoxide in the presence of pyridine to form an osmate ester of the fullerene and also report on the crystal structure of the resulting fullerene. The authors also reported, in one of the article, the detection of the presence of a diolatodioxobis(amine)osmium(VI) ester moiety in the product.

The reaction of primary and secondary amines with fullerenes was reported by Wudl et al. in a paper entitled "Survey of Chemical Reactivity of $C_{60}$, Electrophile and Dieno-polarophile Par Excellence" presented at an ACS symposium on Apr. 14–19, 1991 and later published in 1992 by the American Chemical Society in their ACS Symposium Series entitled "Fullerenes, Synthesis, Properties, and Chemistry of Large Carbon Clusters" as Chapter 11. Reactions of n-propylamine, dodecylamine, t-butylamine, ethylenediamine, and morpholine with $C_{60}$ fullerenes are specifically discussed.

SUMMARY OF THE INVENTION

We have now discovered, however, that polymers having high temperature stability, and sometimes additional advantageous properties, may be formed comprising amine-containing polymerizable monomeric, or polymeric, materials functionalized with fullerene groups, through the amine groups, to impart high temperature stability to the resulting polymers. In some instances enhanced mechanical properties also result and, in the case of cross-linked polymers, a composite can be formed from such materials which is structurally reinforced at the molecular level.

BRIEF DESCRIPTION OF THE DRAWINGS

The sole drawing is a flowsheet generally showing the steps used to form the fullerene-functionalized amine-containing polymer or polymerizable monomer.

DETAILED DESCRIPTION OF THE INVENTION

The invention comprises high temperature stable amine-containing polymerizable monomeric—or polymeric—materials which have been functionalized with fullerene compounds, through the amine groups, to impart high temperature stability and, in some cases, other properties, to a polymer formed from such materials. The fullerene is bonded directly to the nitrogen atom, as shown by the following generalized structure, where $C_k$ is the fullerene:

By use of the term "high temperature stability", with respect to the polymeric materials of the invention (or polymers formed from the polymerizable monomers of the invention), is meant a polymeric material capable of withstanding a temperature of at least 300° C., preferably at least about 350° C. and, in some instances, as high as 650° C., without decomposing or melting.

By use of the term "fullerene" is meant a three dimensional all-carbon molecule which may contain from about 50 to 250 or more carbons formed into a closed shell which, for example, may be spherical, semi-spherical, or tubular in shape. The fullerene preferably will be in purified form, but may also comprise an impure mixture of fullerenes and non-reactive materials such as, for example, crude soot which may contain (in addition to more common fullerenes such as $C_{60}$ and $C_{70}$) a wide distribution of minor amounts of other fullerenes ranging from about $C_{90}$ to beyond $C_{250}$. Thus, the fullerene, as used herein, will be designated by the general formula $C_k$, where k is an even integer ranging from about 50 to about 250, although fullerenes comprising more than 250 carbons, while unusual, should not be deemed to be excluded from use in the invention. However, it will be understood that the higher carbon number fullerenes are not as easily obtained by present known methods.

Examples of fullerenes which can be used in the formation of the fullerene-functionalized amine-containing polymers and polymerizable monomers of the invention, therefore, include $C_{50}$, $C_{60}$, $C_{70}$, $C_{74}$, $C_{76}$, $C_{78}$, $C_{80}$, $C_{82}$, $C_{84}$, $C_{86}$, $C_{88}$, and $C_{90}$, and on up by two carbon atoms, e.g., $C_{92}$, $C_{94}$, etc.

The fullerene groups, with which the particular amine-containing polymers to be described below are functionalized, not only impart high temperature stability characteristics to those resulting polymers, but also may function as reinforcement material, i.e., in lieu of other reinforcement material such as glass fibers, the presence of the fullerene groups on the polymer may provide structural reinforcement for these polymer on the molecular level.

a. General Reactions Parameters for Forming High Temperature Polymers or Polymerizable Monomers To form the fullerene-functionalized amine-containing polymers or polymerizable monomers of the invention, the fullerene and the monomer (or polymer) are first mixed together at room temperature, with the ratio of fullerenes to amine groups such that the amine groups are in stoichiometric excess. The reactants may be blended together in a solvent such as methylene chloride, benzene, toluene, etc. It should be noted that the "solvent" used need not be a solvent for the reactants, but may, instead, be a solvent for the reaction product.

The reaction is carried out at ambient temperature and pressure, preferably under an inert or non-reactive atmosphere such as argon, nitrogen, helium, etc. The reaction is carried out over an extended period of from about 1–2 days up to about 1–2 weeks. It should be noted that attempting to carry out the reaction at an elevated temperature, i.e. at a temperature above ambient, e.g., 40° C. or higher, does not appear to accelerate the reaction, but may cause undesirable side reactions.

After the reaction is complete, the solvent is evaporated off, leaving the desired product and excess amine residues. The impure product mix is then washed with a selective solvent which will dissolve either the fullerene-functionalized amine product or the amine residues (but not both). For example, to separate the product by dissolving the amine residues, the impure product may be washed using a non-polar solvent such as hexane, pentane, or an ether or a polar solvent such as deionized water, methanol, or ethanol, to dissolve any remaining amine residues without dissolving the fullerene-functionalized amine-containing monomer or polymer. The product fullerene-functionalized amine-containing would then be recovered by filtration to separate off the amine-containing solvent.

When the resulting product is a fullerene-functionalized amine-containing product in monomeric form, the resulting monomer may not only be polymerized, but also may be copolymerized, or reacted, e.g., crosslinked, with another polymerizable material, using conventional polymerization procedures, to provide the desired high temperature stable polymeric material.

Thus, the fullerene-functionalized monomer may be copolymerized with other (non-fullerene-functionalized) thermosetting or thermoplastic materials such as, for example, epoxies, saturated (thermoplastic) polyesters, unsaturated (thermosetting) polyesters, polyacrylics, bisphenols and diols, bisthiols, bisamines, bishydrides, dicarboxylic acids, etc., to form a copolymerized product having enhanced high temperature stability and mechanical properties.

Fullerene-Functionalized Polyalkyleneimines Formed From Non-Cyclic Monomers

In one embodiment, wherein the amino group forms a part of the backbone of a linear polymer, the polymer may be a functionalized polyalkyleneimine which may be first formed (polymerized) and then functionalized with fullerenes bonded to one or more of the nitrogens in the polymer; or the monomer may be first functionalized with fullerene groups and then polymerized. Such a monomer or polymer, prior to functionalization with one or more fullerenes, may be represented by the following formula:

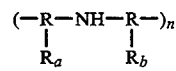

where R is a 1–6 carbon branched or straight chained alkylene, such as methylene, ethylene, propylene, butylene, amylene, or hexylene; n may be from 1 to about 10,000, $R_a$ and $R_b$ may be the same or different and are each selected from the group consisting of hydrogen, 1–8 carbon alkyls, 1–8 carbon hydroxy alkyls, aryls, and hydroxy aryls. The general structure of such a monomer (or polymer), after being functionalized with one or more fullerenes, would be:

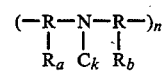

Such a fullerene-functionalized polymer, when R is methylene, $R_a$ and $R_b$ are each hydrogen, and the fullerene is $C_{60}$, i.e., a $C_{60}$ fullerene-functionalized polyethyleneimine, may be represented, by way of illustration and not of limitation, by the following formula:

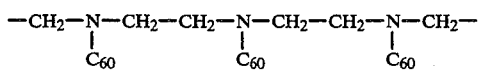

The fullerene functionalized groups on the polymer may all be the same, e.g. may all be of one molecular weight, such as all $C_{60}$ fullerenes as shown above, or may comprise different fullerenes, formed by functionalizing the polymer with a mixture of fullerenes of various molecular weights.

Such polyalkyleneimines, e.g., straight chain polyethyleneimine, may be made by hydrolyzing the corresponding polyalkylene oxazoline, e.g., linear polyethyloxazoline, using procedures well-know to those skilled in the art, to obtain the corresponding polyalkyleneimine precursor, e.g., linear polyethyleneimine.

Other polyalkyleneimine precursors to the fullerene-functionalized polymers of the invention, such as branched polyethyleneimine, are commercially available polymers, having the generalized formula:

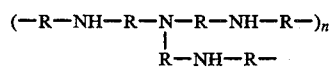

where R is a 1–6 carbon branched or straight chained alkylene, as previously discussed above, and n may be from 2 to about 10,000.

Such a branched structure, after being functionalized with fullerene groups, would have the general structure:

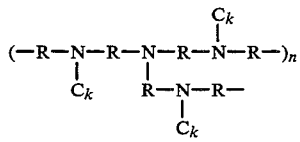

c. Polyalkyleneimine Polymers Formed from Fullerene-Functionalized Aziridines

The invention further includes high temperature stable polyalkyleneimine polymers formed by the polymerization of fullerene-functionalized cyclic monomers such as aziridines, or copolymerization of such fullerene-functionalized cyclic aziridine monomers with other monomers to form either thermoplastic or thermosetting polymers, as previously discussed.

The fullerene-functionalized aziridine monomer may be characterized by the following formula (using $C_{60}$ again merely by way of illustration):

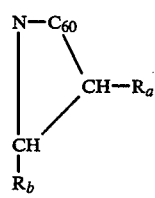

wherein $R_a$, and $R_b$ may be the same or different and are each selected from the group consisting of hydrogen, 1-8 carbon alkyls, 1-8 carbon hydroxy alkyls, aryls, and hydroxy aryls.

After formation of the fullerene-functionalized aziridine monomer, the monomer may be polymerized to form a high temperature stable polyalkyleneimine polymer such as, for example, the previously illustrated $C_{60}$ fullerene-functionalized polyethyleneimine polymer.

As with the non-cyclic monomers discussed above, the presence of the fullerene groups in the aziridine molecules also may function as reinforcement materials, i.e., in lieu of other reinforcement materials such as glass fibers, to provide structural reinforcement on the molecular level.

d, Fullerene-Functionalized Polymers with Amine Side Chains

In another embodiment, wherein the amino group or groups does not form a part of the backbone of the polymer, but rather comprises a part of a side chain on each monomer, the polymer is again functionalized with fullerene groups, through the amine groups on the side chain, to impart high temperature stability to the polymer. As in the previous embodiments, either the monomer may be functionalized with the fullerene and then polymerized, or the polymer may be first formed and then functionalized with the fullerene groups, to impart the desired high temperature properties to the polymer.

Such monomers or polymers, prior to functionalization with one or more fullerenes, may comprise any polymer (or polymerizable monomer) containing one or more amino side groups to which the fullerene group will be bonded. For example, polymerizable monomers containing amino side groups include, in addition to alkylenes: diesters, diacids, diimines, diamides, diisocyanates, and dithiols.

Representative examples of such polymers containing amino side groups include, by way of example, polyallyl amine, poly(aminopropylmethyl) siloxane, poly(aminomethyl) ethylene oxide, and poly(aminoalkylamido) phosphazene.

Such monomers or polymers can be illustrated by the following general structural formula:

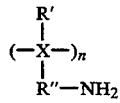

where:
X is selected from the group consisting of ethylene

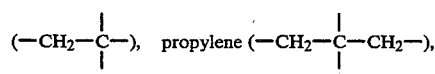

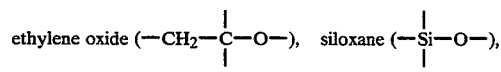

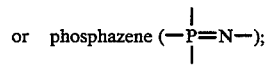

wherein R' is H, $-CH_3$, or $-NH-R'''-NH_2$;
R" is $-NH-R'''$ or $(-CH_2-)_m$ where m is 0-4, and n is 1 to 10,000; and
R''' is $(-CH_2-)_m$ where m is 0-4; and n is 1 to 10,000.

An example of such a monomer and corresponding polymer is allyl amine and polyallyl amine as illustrated below before and after functionalization with a fullerene, using $C_{60}$ again by way of illustration and not of limitation.

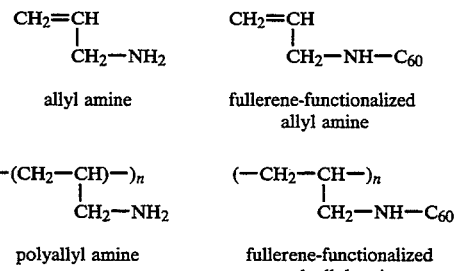

Fullerene-functionalized alkyl(aminoalkylene)siloxanes in this embodiment have the general structural formula:

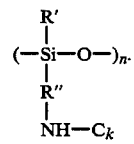

A specific example of such a fullerene-functionalized alkyl(aminoalkylene)siloxane (again using $C_{60}$ only by way of illustration) is fullerene-functionalized methyl(aminopropylene)siloxane having the structure:

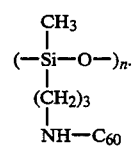

Fullerene-functionalized (aminoalkylene)polyethylene oxides in this embodiment have the general structural formula:

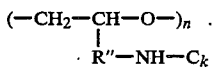

A specific example of such a fullerene-functionalized (aminoalkylene)polyethylene oxide (again using $C_{60}$ only by way of illustration) is fullerene-functionalized (aminomethylene)polyethylene oxide having the structure:

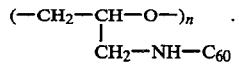

Fullerene-functionalized(aminoalkylene-amido)polyphosphazenes in this embodiment have the general structural formula:

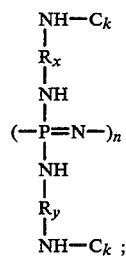

where x and y are each 1-4.

The following examples will serve to further illustrate the high temperature fullerene-functionalized amine-containing polymers and polymerizable monomers of the invention.

EXAMPLE I

Into a round-bottom flask containing 10 mg. of a mixture of $C_{60}$ and $C_{70}$ fullerenes (in a weight ratio of about 80 wt. % $C_{60}$ and about 20 wt. % $C_{70}$) was added a solution consisting of 5 ml. of $CHCl_3$ having dissolved therein 17.4 mg. of linear poly(ethyleneimine) having a molecular weight of 50,000. The reaction mixture was stirred at room temperature for 16 hours. The $CHCl_3$ was removed under vacuum to obtain a black colored solid product. This product had a poor solubility in $CHCl_3$ and acetone.

The above reaction was repeated under melt conditions at 80° C. without any solvent. The reaction occurred completely and a black colored solid product of fullerene-functionalized linear poly(ethyleneimine) was obtained.

EXAMPLE II

To a solution comprising 20 mg. of the fullerene mixture of Example I dissolved in 3.0 ml of dry benzene was added 300 mg. of freshly distilled allylamine. The reaction mixture was stirred under argon for 7 days and the solvent was evaporated under vacuum to get the residue. The residue was stirred in ether and the insoluble material was filtered, washed repeatedly with ether, and then dried to get 20 mg. of fullerene-functionalized allylamine product.

EXAMPLE III

The experiment of Example II was repeated using diallylamine instead of allylamine and using 25 mg of the fullerene mixture of Example I dissolved in 3.0 ml. of dry benzene. The reaction mixture was stirred for 17 days, instead of 7 days, and 22 mg. of fullerene-functionalized diallylamine product was obtained.

EXAMPLE IV

To a solution comprising 30 mg. of the fullerene mixture of Example I dissolved in 3.0 ml of dry benzene in a round bottom flask was added 4 mg. of polyallylamine hydrochloride and 30 mg. of triethylamine. The reaction mixture was stirred at room temperature for 5 days. The solvent was then evaporated to yield a solid residue that was repeatedly washed with methanol and benzene to yield a fullerene-functionalized copolymer of polyallylamine and triethylamine.

EXAMPLE V

To 80 mg of the $C_{60}/C_{70}$ fullerene mixture of Example I was added 5.0 ml. of dry benzene and the mixture was then stirred for a few minutes under argon in a round-bottom flask to form a solution to which was added 650 mg. of aziridine. The reaction mixture was stirred under argon at room temperature for 7 days. The solvent and excess aziridine was removed under reduced pressure and 160 mg of fullerene-functionalized aziridine product was recovered.

The reaction was repeated with 1.0 g of 2-methylaziridine substituted for the 650 mg. of aziridine and 160 mg. of fullerene-functionalized 2-methylaziridine product was recovered.

EXAMPLE VI

To 26 mg of the fullerene-functionalized 2-methylaziridine formed in Example V was added 52 mg of Epon 828 epoxy resin (a digylcidyl-4,4'-isopropylidenediphenol epoxy resin from Shell) and 0.3 ml of toluene in a vial. The mixture was swirled to form a homogeneous solution and the toluene was then evaporated, using an oil bath, to form a concentrated solution which was coated on a quartz disc and then heated in an oven at about 180° C. for 16 hours to form the fullerene-functionalized polyalkyleneimine/epoxy copolymer product. To test the high temperature stability of the resulting fullerene-functionalized copolymer, the copolymer was subjected to Differential Scanning Calorimetry (DSC) testing. At 325° C., the copolymer weight loss was recorded as 10 wt. %, which is indicative of stability of the copolymer up to this temperature.

The above test was repeated using, however, the fullerene-functionalized 2-methylaziridine and Epon 828 epoxy resin in a weight ratio of 1:4, instead of the above 1:2 ratio. The resulting copolymer exhibited a weight loss of 10 wt. % at 220° C.

EXAMPLE VII

To 12 mg of the fullerene-functionalized 2-methylaziridine formed in Example V was added 48 mg of bisphenol A (4,4'-isopropylidenebisphenol) and 0.3 ml of toluene in a vial. The mixture was shakened for awhile to dissolve the fullerene-functionalized 2-methylaziridine and then 5 drops of N,N-dimethylformamide was added to dissolve the bisphenol A. The toluene was then partially evaporated, using an oil bath, to form a concentrated solution which was coated on a quartz disc and then heated in an oven at about 180° C. for 16 hours to form a fullerene-functionalized polyalkyleneimine/bisphenol A copolymer product. To test the high temperature stability of the resulting fullerene-functionalized copolymer, the copolymer was subjected to DSC testing. At 375° C., the copolymer weight loss was recorded as 10 wt. %, indicative of stability up to this temperature.

The above test was repeated using, however, the fullerene-functionalized 2-methylaziridine and Epon Bisphenol A in a weight ratio of 1:6, instead of the above 1:4 ratio. The resulting copolymer exhibited a weight loss of 10 wt. % at 260° C.

EXAMPLE VIII

A solution was formed by dissolving 20 mg of novolac resin (having a melting point of 70°–80° C.) in 5 drops of N,N-dimethylformamide in a small vial. To this was then added 10 mg of the fullerene-functionalized 2-methylaziridine of Example V. The reaction mixture was then swirled to form a homogeneous solution and this solution was then coated on a quartz disc and heated in an oven at about 180° C. for 16 hours to form the fullerene-functionalized polyalkyleneimine/-novolac copolymer product. The high temperature stability of the resulting fullerene-functionalized copolymer was then determined using DSC testing. At 340° C., the copolymer weight loss was recorded as 10 wt. %, indicating that the copolymer was stable up to this temperature.

The above test was repeated using, however, the fullerene-functionalized 2-methylaziridine and novalac in a weight ratio of 1:6, instead of the above 1:2 ratio. The resulting copolymer exhibited a weight loss of 10 wt. % at 375° C.

Thus, the invention comprises novel fullerene-functionalized amine-containing polymers or polymerizable monomers characterized in that the resulting polymer exhibits high temperature stability apparently due to the presence of the fullerene groups on the polymer. In addition, in some cases the polymers further show enhanced mechanical properties as well, due to the functionalization of the polymer with the fullerenes.

Having thus disclosed the invention, what is claimed is:

1. A fullerene-functionalized amine-containing polymeric or polymerizable monomeric material, characterized by high temperature stability in polymerized form, having at least one fullerene group bonded to each amine group on the polymeric or polymerizable monomeric material to thereby impart said high temperature stability to said polymeric material or to a polymeric material formed from said polymerizable monomeric material.

2. The fullerene-functionalized amine-containing material of claim 1 wherein said high temperature stability, when in polymerized form, further comprises the ability to withstand a temperature of at least about 300° C. without decomposing or melting.

3. The fullerene-functionalized amine-containing material of claim 1 wherein said high temperature stability, when in polymerized form, further comprises the ability to withstand a temperature of at least about 350° C. without decomposing or melting.

4. The fullerene-functionalized amine-containing material of claim 2 wherein said material is a fullerene-functionalized alkyleneimine monomer or polyalkyleneimine having the structural formula:

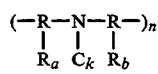

wherein R is a 1–6 carbon branched or straight chained alkylene; n may be from 1 to about 10,000; k is an even integer from 50 to at least about 250; and $R_a$ and $R_b$ may be the same or different, and are each selected from the group consisting of hydrogen, 1–8 carbon alkyls, 1–8 carbon hydroxy alkyls, aryls, and hydroxy aryls.

5. The fullerene-functionalized amine-containing material of claim 4 wherein said fullerene-functionalized polyalkyleneimine is a fullerene-functionalized polyethyleneimine.

6. The fullerene-functionalized amine-containing material of claim 2 wherein said material is a fullerene-functionalized polyalkyleneimine formed from a cyclic monomer having the structural formula:

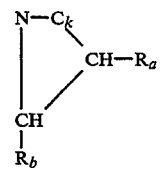

wherein k is an even integer from 50 to at least about 250, and $R_a$ and $R_b$ may be the same or different and are each selected from the group consisting of hydrogen, 1–8 carbon alkyls, 1–8 carbon hydroxy alkyls, aryls, and hydroxy aryls.

7. The fullerene-functionalized amine-containing material of claim 2 wherein said fullerene-functionalized material comprises a branched alkyleneimine monomer or polyalkyleneimine structure having the structural formula:

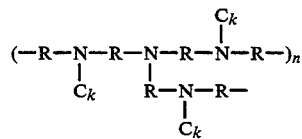

wherein R is a 1–6 carbon branched or straight chained alkylene; n may be from 1 to about 10,000; and k is an even integer from 50 to at least about 250.

8. The fullerene-functionalized amine-containing material of claim 2 wherein said material is a fullerene-functionalized polymer or polymerizable monomer having the general structural formula:

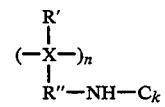

where X is selected from the group consisting of ethylene, propylene, ethylene oxide, siloxane, and phosphazene; R' is H, —CH₃, or —NH—R'''—NH₂; R" is —N-H—R''' or (—CH₂—)$_m$; R''' is (—CH₂—)$_m$; m is 0–4; n is 1 to 10,000; and k is an even integer from 50 to at least 250.

9. The fullerene-functionalized amine-containing material of claim 8 wherein X is selected from the group consisting of ethylene and propylene.

10. The fullerene-functionalized amine-containing material of claim 9 wherein said material is a fullerene-functionalized allyl amine polymer or polymerizable monomer.

11. The fullerene-functionalized amine-containing material of claim 9 wherein said material is a fullerene-functionalized alkyl(aminoalkylene) siloxane polymer or polymerizable monomer having the general structural formula:

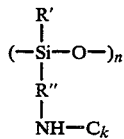

wherein R' is H, —$CH_3$, or —NH—R'''—$NH_2$; R' is —NH—R''' or (—$CH_2$—)$_m$; R''' is (—$CH_2$—)$_m$; m is 0-4; n is 1 to 10,000; and k is an even integer from 50 to at least 250.

12. The fullerene-functionalized amine-containing material of claim 8 wherein said material is a fullerene-functionalized (aminoalkylene) ethylene oxide polymer or polymerizable monomer having the general structural formula:

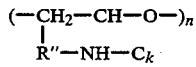

wherein R' is —NH—R''' or (—$CH_2$—)$_m$; R''' is (—$CH_2$—)$_m$; m is 0-4; n is 1 to 10,000; and k is an even integer from 50 to at least 250.

13. The fullerene-functionalized amine-containing polymerizable monomeric material of claim 1 wherein said monomeric material is copolymerized with another monomer.

14. A fullerene-functionalized alkyleneimine characterized by high temperature stability in polymerized form having the general structural formula:

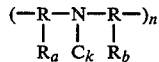

where R is a 1-6 carbon branched or straight chained alkylene; n is an integer from 1 to about 10,000, k is an even integer from about 50 to at least about 250; and $R_a$ and $R_b$ may be the same or different and are each selected from the group consisting of hydrogen, 1-8 carbon alkyls, 1-8 carbon hydroxy alkyls, aryls, and hydroxy aryls.

15. A fullerene-functionalized polymer or polymerizable monomer characterized by high temperature stability in polymerized form having the general structural formula:

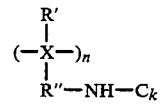

where X is selected from the group consisting of ethylene, propylene, ethylene oxide, siloxane, and phosphazene; R' is H, —$CH_3$, or —NH—R'''—$NH_2$; R' is —NH—R''' or (—$CH_2$—)$_m$ where m is 0-4; R''' is (—$CH_2$—)$_m$ where m is 0-4; n is 1 to 10,000; and $C_k$ is a fullerene group where k is 50 to 250.

16. A fullerene-functionalized aziridine monomer characterized by high temperature stability when in polymerized form having the structural formula:

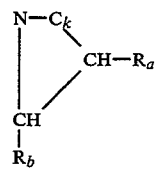

where $R_a$ and $R_b$ may be the same or different and are each selected from the group consisting of hydrogen and 1-8 carbon alkyls; and $C_k$ is a fullerene group where k is an even integer from about 50 to at least about 250.

17. A fullerene-functionalized amine-containing polymeric or polymerizable monomeric material characterized by high temperature stability in polymerized form, comprising a fullerene-functionalized (aminoalkyleneamido) phosphazene polymer or polymerizable monomer having the general structural formula:

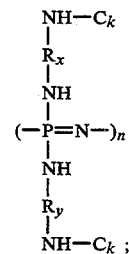

where $R_x$ and $R_y$ are each 1-4 carbon alkylenes.

* * * * *